UNITED STATES PATENT OFFICE.

EPHRAIM LEVITT, OF WESTMOUNT, QUEBEC, CANADA.

PROCESS FOR TREATING POTASSIUM-BEARING SILICATES.

1,399,216.  Specification of Letters Patent.  Patented Dec. 6, 1921.

No Drawing.  Application filed December 27, 1920. Serial No. 433,438.

*To all whom it may concern:*

Be it known that I, EPHRAIM LEVITT, a subject of the King of Great Britain, and resident of the city of Westmount, in the Province of Quebec and Dominion of Canada, have invented certain new and useful Improvements in Processes for Treating Potassium-Bearing Silicates, of which the following is a specification.

This invention relates to improvements in process for treating potassium bearing silicates and the objects of the invention are to provide a simple and economical process by which it will be possible to recover in commercially available form the various constituents of potassium bearing silicates such as orthoclase feldspar.

Further objects of the invention are to provide a process in which the principal reagent used may be recovered and the process thus become cyclic. The process is based upon the discovery that if a potassium bearing silicate such as orthoclase feldspar is fused with a flux containing boron trioxid and is later comminuted and suspended in water and treated with sulfur dioxid, bisulfites of the various constituent parts of the orthoclase feldspar are formed which may be conveniently separately recovered as hereinafter explained.

In practising the invention, orthoclase feldspar is first fused in a furnace with boron trioxid ($B_2O_3$) in such proportion as to provide sufficient boron trioxid to combine with the metal oxids of the orthoclase to form borates.

Various proportions of boron trioxid ($B_2O_3$) can be used, for the metallic oxids combine with different proportions of boron trioxid ($B_2O_3$) to form a series of borates. For example, aluminum oxid ($Al_2O_3$) combines with boron trioxid ($B_2O_3$) to form the following borates, (1) $3Al_2O_3.B_2O_3$, (2) $2Al_2O_3.B_2O_3$, (3) $3Al_2O_3.2B_2O_3$, (4) $Al_2O_3.3B_2O_3$, etc. Potassium oxid ($K_2O$) combines with boron trioxid ($B_2O_3$) to form the following borates, (1) $K_2O.B_2O_3$, (2) $K_2O.2B_2O_3$, (3) $K_2O.5B_2O_3$, etc.

Instead of using boric oxid itself, borax or any compound that produces boron trioxid at high temperatures, such as crude borax ore may be used.

The melt resulting from the heating of the feldspar with boron trioxid in the furnace is then ground or otherwise reduced to a fine powder and is suspended in water and sulfur dioxid ($SO_2$) is passed into it until all the borates are decomposed and the metallic radicals are converted into bisulfites. The boric acid ($B(OH)_3$) formed during the reaction and the bisulfites go into solution. The silica ($SiO_2$) remains undissolved.

The solution now contains, in addition to the undissolved silica, aluminum bisulfite, potassium bisulfite, sodium bisulfite and ferrous bisulfite.

Any traces of magnesium and the alkaline earth metals that may be present in the feldspar, will also go into solution as bisulfites.

The sludge is filtered. The filter cake consists of silica ($SiO_2$) which readily dissolves in alkali *i. e.* in soda ash ($Na_2CO_3$) and in caustic soda ($NaOH$) to form water glass. The filtrate which contains the bisulfites and boric acid is heated at or near the boiling point. Sulfur dioxid ($SO_2$) is given off, the bisulfites are converted into sulfites and all the aluminum is thrown down as aluminum hydroxid ($Al(OH)_3$).

At the same time, the traces of the sulfites of magnesium and the alkaline earth metals that may be present will be thrown down.

The aluminum hydroxid is then filtered off. The filtrate, which contains the sulfites and boric acid, is heated preferably near the boiling point, alone, or with air blown through, or with stirring to aid the oxidation. The iron is thrown down as ferric hydroxid $Fe(OH)_3$ and the sulfites are oxidized to sulfates.

Basic ferric sulfite is first formed and is immediately hydrolyzed to ferric hydroxid. The ferric hydroxid is then filtered off. The filtrate now contains potassium and sodium sulfates and boric acid. These are separated by fractional crystallization.

The yield obtained is theoretical and all boric acid is recovered and can be used over again.

All the ingredients will react, and are used in substantially the quantities corresponding to their chemical equivalents. The yield of the various combinations recovered will depend upon the composition of the feldspar or other potassium bearing silicate which is used in the process. The following indicates the range in composition of commercial orthoclase feldspar:—

Silica $SiO_2$ (63–75%),
Alumina, $Al_2O_3$ (13–20%),
Ferric oxid $Fe_2O_3$ (none–.3%),
Potassium oxid $K_2O$ (8–14%),
Sodium oxid $Na_2O$ (1–6%), with traces of CaO and MgO and in rare cases, traces of BaO and FeO.

I believe that the reactions which take place during the process may be indicated by the following equations. The various borates formed by the combination of boron trioxid with aluminum oxid and potassium oxid have all been indicated. The addition of the sulfur dioxid to the aluminum borate and potassium borate results in the following reactions:—

$$Al(BO_2)_3 + 3SO_2 + 6H_2O = Al(HSO_3)_3 + 3B(OH)_3$$
$$KBO_2 + SO_2 + 2H_2O = KHSO_3 + B(OH)_3$$

Any sodium borate or ferric borate in the solution will also react in a similar manner, as follows:—

$$NaBO_2 + SO_2 + 2H_2O = NaHSO_3 + B(OH)_3$$
$$Fe(BO_2)_3 + 3SO_2 + 6H_2O = Fe(HSO_3)_3 + 3B(OH)_3$$

The transformation of the ferric bisulfite to ferrous bisulfite may be indicated by the following:—

$$2Fe(HSO_3)_3 + SO_2 + H_2O = 2Fe(HSO_3)_2 + H_2SO_4 + H_2O + 2SO_2$$

The conversion of the bisulfites into the sulfites and the breaking up of the aluminum sulfite is indicated by the following:—

$$2KHSO_3 \rightarrow K_2SO_3 + SO_2 + H_2O$$
$$2NaHSO_3 \rightarrow Na_2SO_3 + SO_2 + H_2O$$
$$Fe(HSO_3)_2 \rightarrow FeSO_3 + SO_2 + H_2O$$
$$2Al(HSO_3)_3 \rightarrow Al_2(SO_3)_3 + 3SO_2 + 3H_2O$$
$$Al_2(SO_3)_3 + 6H_2O = 2Al(OH)_3 + 3SO_2 + 3H_2O.$$

It will be seen that in the process, the relatively weak boric acid which serves as a flux during the melting of the feldspar is replaced when the ground melt is suspended in water by the sulfurous acid produced by the addition of the sulfur dioxid. All of the ingredients recovered are in commercially available form. The silica is recovered as water glass. The aluminum is recovered as aluminum hydroxid. The potassium and sodium are recovered as potassium and sodium sulfates and the boric acid is recovered as such and may be used again in the process.

As many changes could be made in the above process and many widely different embodiments of my invention within the scope of the claims, constructed without departing from the spirit or scope thereof, it is intended that all matter contained in the accompanying specification shall be interpreted as illustrative and not in a limiting sense.

What I claim as my invention is:—

1. The herein described method of treating potassium bearing silicates which comprises first treating the silicate with a flux containing boron trioxid, then comminuting and mixing with water, then treating the solution with sulfur dioxid and then recovering the compounds formed.

2. The herein described method of treating potassium bearing silicates which comprises first treating the silicate with a flux containing boron trioxid, then comminuting and mixing with water, then treating the solution with sulfur dioxid and then heating the solution and recovering the compounds formed.

3. The herein described method of treating potassium bearing silicates which comprises first treating the silicate with a flux containing boron trioxid, then comminuting and mixing with water, then treating the solution with sulfur dioxid and then boiling the solution and separately recovering the compounds formed.

4. The herein described method of treating potassium bearing silicates which comprises first treating the silicate with a flux containing boron trioxid, then comminuting and mixing with water, then treating the solution with sulfur dioxid and then heating the solution and blowing air therethrough and separately recovering the compounds formed.

5. The herein described method of treating potassium bearing silicates which comprises first treating the silicate with a flux containing boron trioxid, then comminuting and mixing with water, then treating with sulfur dioxid, then filtering the sludge, then heating the filtrate to throw down aluminum hydroxid, then separating the aluminum hydroxid from the filtrate, then heating and oxidizing the filtrate to throw down the ferric hydroxid, then filtering the solution to recover the ferric hydroxid.

6. The herein described method of treating potassium bearing silicates which comprises first treating the silicate with a flux containing boron trioxid, then comminuting and mixing with water, then treating with sulfur dioxid, then filtering the sludge, then heating the filtrate to throw down aluminum hydroxid, then separating the aluminum hydroxid from the filtrate, then heating and oxidizing the filtrate to throw down the ferric hydroxid, then filtering the solution to recover the ferric hydroxid and then separating the remaining compounds by fractional crystallization.

7. The herein described method of treating potassium bearing silicates which comprises first treating the silicate with a flux containing boron trioxid, then grinding the melt to a powder and suspending in water, then introducing sulfur dioxid into the solution, then filtering the sludge, then boiling the filtrate to precipitate the aluminum hydroxid and drive off the sulfur dioxid, then filtering off the aluminum hydroxid, then heating the solution under oxidizing condition to throw down the ferric hydroxid, then filtering off the ferric hydroxid, then separating the sulfates remaining in the filtrate by fractional crystallization.

8. The herein described method of treating potassium bearing silicates which comprises first treating the silicate with a flux containing boron trioxid, then grinding the melt to a powder and suspending in water, then introducing sulfur dioxid into the solution, then filtering the sludge, then boiling the filtrate to precipitate the aluminum hydroxid and drive off the sulfur dioxid, then filtering off the aluminum hydroxid, then heating the solution under oxidizing condition to throw down the ferric hydroxid, then filtering off the ferric hydroxid, then separating the sulfates and boric acid remaining in the filtrate by fractional crystallization and then using the boric acid again to repeat the process.

9. The herein described method of treating potassium bearing silicates which comprises first fluxing the silicates, then comminuting the melt, then forming bisulfite compounds with the principal ingredients in the melt, then converting the bisulfite compounds into sulfates, and then separating the sulfates.

10. The herein described method of treating potassium bearing silicates which comprises first melting the silicates with a suitable flux containing boron trioxid, then grinding to a powder and forming bisulfite compounds with the principal ingredients, then forming sulfate compounds and then separating the sulfate compounds by fractional crystallization.

11. A step in the treatment of potassium bearing silicates which consists in treating such silicates with a flux containing boron trioxid.

In witness whereof I have hereunto set my hand in the presence of two witnesses.

EPHRAIM LEVITT.

Witnesses:
H. F. WILLIAMS,
N. MERA FOCHEAU.